United States Patent
Guillouard et al.

(10) Patent No.: US 8,634,379 B2
(45) Date of Patent: Jan. 21, 2014

(54) TRANSMISSION METHOD FOR A WIRELESS NETWORK AND CORRESPONDING RECEPTION METHOD

(75) Inventors: Samuel Guillouard, Chantepie (FR); Patrick Fontaine, Rennes (FR)

(73) Assignee: Thomson Licensing, Issy les Moulineaux (FR)

( * ) Notice: Subject to any disclaimer, the term of this patent is extended or adjusted under 35 U.S.C. 154(b) by 685 days.

(21) Appl. No.: 12/661,661

(22) Filed: Mar. 22, 2010

(65) Prior Publication Data

US 2010/0246539 A1    Sep. 30, 2010

(30) Foreign Application Priority Data

Mar. 27, 2009  (FR) .................................... 09 01456

(51) Int. Cl.
*H04W 80/04*    (2009.01)
(52) U.S. Cl.
CPC .................................... *H04W 80/04* (2013.01)
USPC .......................................................... 370/331
(58) Field of Classification Search
USPC .......................................................... 370/331
See application file for complete search history.

(56) References Cited

U.S. PATENT DOCUMENTS

| 2004/0246998 A1 * | 12/2004 | Ma et al. ........................ 370/527 |
| 2008/0170490 A1 | 7/2008 | Connors et al. |
| 2009/0238141 A1 * | 9/2009 | Damnjanovic et al. ....... 370/331 |

FOREIGN PATENT DOCUMENTS

| EP | 1677460 A1 | 7/2006 |
| EP | 1722498 A2 | 11/2006 |
| WO | WO2008/137354 A1 | 11/2008 |

OTHER PUBLICATIONS

French Search Report date Nov. 5, 2009.

* cited by examiner

*Primary Examiner* — Mark Rinehart
*Assistant Examiner* — Matthew Hopkins
(74) *Attorney, Agent, or Firm* — Tutunjian & Bitetto, P.C.

(57) ABSTRACT

The invention relates to a method for transmitting in a wireless network comprising a plurality of base stations, that transmit frames at a same frequency, and at least one mobile terminal. In order to optimise the size of a frame header, the method comprises:

Figure 1:
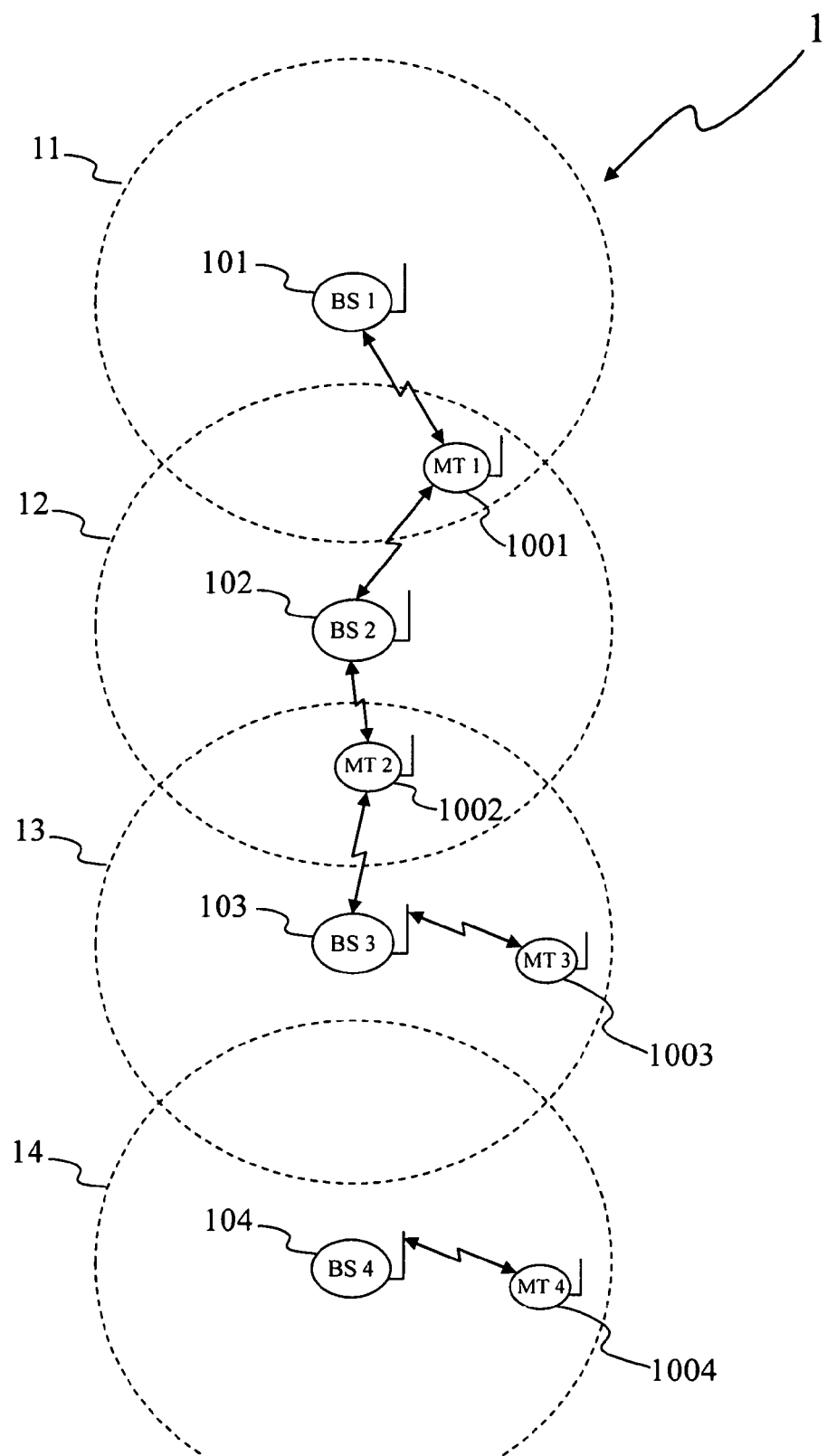

transmission, by a first set comprising at least two base stations, of at least a first part of the frame header on a same first physical channel comprising at least a first temporal interval, transmission, by at least a second set comprising at least one base station, of at least one second part of the frame header on a second physical channel comprising at least one second temporal interval different to the first temporal interval, the at least one second set being different from, but included in, the first set.

The invention also relates to the corresponding method for reception.

15 Claims, 10 Drawing Sheets

TRANSMISSION METHOD FOR A WIRELESS NETWORK AND CORRESPONDING RECEPTION METHOD

This application claims the benefit, under 35 U.S.C. §119 of French Patent Application 0901456, filed Mar. 27, 2009.

1. SCOPE OF THE INVENTION

The invention relates to the domain of telecommunications and more specifically to the wireless transmission and reception of data, in a system comprising several base stations transmitting frames in a synchronous manner and at a same frequency.

2. PRIOR ART

According to the prior art, a mobile network, for example of type GSM (Global System for Mobile communication), WiMAX (based on the standard IEEE 802.16) or LTE (Long Term Evolution), of the 3GPP ($3^{rd}$ Generation Partnership Project) project, has cells each containing a base station, a cell being defined by the area covered by the transmission of the base station. When a mobile terminal progresses in such a network, it is sometimes necessary that the mobile terminal passes from one cell to another without interruption to the service at the level of the mobile terminal, the transmission frequency varying from one cell to another. A mechanism enabling such continuity to be assured is commonly referred to as "handover".

According to a technique known in the prior art called SFN (Single Frequency Network), several base stations transmit synchronously a single OFDM (Orthogonal Frequency Division Multiplexing) signal. In this way, a mobile terminal receives a combination of signals from several transmitters and decodes the combination thus obtained using the properties specific to OFDM for the cancellation of inter-symbol interference. The transmission frequency used by the base stations of an SFN network being the same, it is then no longer necessary to implement the "handover" mechanism for a mobile terminal progressing in such an SFN network. Such a solution is described in the French patent application filed under the number FR0806545 on Nov. 21, 2008 in the name of Thomson Licensing SA.

In a standard cell system, that is to say non-SFN, a communication frame header is broadcast by a base station to all the mobile terminals present in the cell defined by the transmission coverage area of the base station. The frame header notably comprises an item of information representative of the structure of the frame, that is to say for example the allocation of intervals composing the frame to the different mobile terminals present in the cell considered. From the information contained in the frame header, each mobile terminal knows which intervals are allocated to it, that is to say during which intervals of the frame it communicates with the base station of the cell. In the case of an SFN network, the notion of a cell as defined in a standard cell system no longer exists as all the base stations of the SFN network transmit communication frames synchronously and at the same frequency. The header of a communication frame of such an SFN network is broadcast by the base stations of the SFN network and comprises an item of information representative of the structure of the frame, that is to say the allocation of intervals of the frame to all the mobile terminals present in the network, a single interval being able to be used by several mobile terminals when these mobile terminals are sufficiently distant so that they do not communicate with a same base station, that is to say when each of these mobile terminals communicates with one (or several) base station(s) that is (are) specific to it. The higher the number of mobile terminals present in the network, the greater the amount of information representative of the structure of the frame and the greater the size of the header. The problem with such a header is that it occupies a large share of the communication frame, leaving little space for the communication of useful data (or "payload").

3. SUMMARY OF THE INVENTION

The purpose of the invention is to overcome at least one of these disadvantages of the prior art.

More specifically, the purpose of the invention is notably to optimise the size of the header of a communication frame in a network comprising several base stations transmitting frames at the same frequency and in a synchronised manner.

The invention relates to a method for transmission in a wireless network, said network comprising a plurality of base stations and at least one mobile terminal, the plurality of base stations transmitting frames at the same frequency. In order to optimise the size of the frame header, the method comprises the following steps:

transmission, by a first set comprising at least two base stations, of at least a first part of the frame header over a same first physical channel comprising at least a first temporal interval, and transmission, by at least a second set comprising at least one base station, of at least a second part of the frame header over at least a second physical channel comprising at least a second temporal interval, the at least one second temporal interval being different from the at least one first temporal interval, the at least one second set being different from the first set, the at least one second set being included in the first set.

According to a particular characteristic, the at least one second part of the frame header comprises at least one first information element representative of the allocation of at least one frame interval to at least one first mobile terminal.

Advantageously, the at least one first part of the header comprises an item of information representative of a frame structure, the at least one first information element making reference to at least one part of the information representative of the structure.

According to another characteristic, the at least one second part of the frame header comprises an item of information representative of a frame structure.

Advantageously, the at least one first part of the frame header comprises an item of information representative of the structure of the at least one second part of the header.

According to a specific characteristic, the step of transmission of the at least one first part of the header comprises a step of transmission of at least a first pilot and in that the step of transmission of the at least one second part of the header comprises a step of transmission of at least a second pilot.

According to another characteristic, a second pilot is transmitted for each at least one first information element.

Advantageously, the method comprises a step of assignment of the at least one second set to at least one mobile terminal.

According to a particular characteristic, the method comprises a step of transmission, by at least a third set comprising at least two base stations, of the at least one second part of the header, the at least one second part of the frame header comprising at least a second information element representative of the allocation of at least one frame interval to at least a second mobile terminal, the second and third sets having at least one common base station, the second and third sets being different, the at least one third set being different from the first set and being included in the first set.

The invention also relates to a method for reception for a wireless network, the network comprising a plurality of base stations and at least one mobile terminal, the plurality of base stations transmitting frames at a single frequency, the method comprising the following steps, implemented by the at least one mobile terminal:

decoding of at least a received first part of the frame header, the at least one first header part being transmitted by a first set comprising at least two base stations over a same first physical channel comprising at least a first temporal interval, and decoding of at least one part of at least one received second part of the frame header, the at least one second part of the header being transmitted by at least one second set comprising at least one base station over at least a second physical channel comprising at least a second temporal interval, the at least one second temporal interval being different from the at least one first temporal interval, the at least one second set being different from the first set, the at least one second set being included in the first set.

According to a particular characteristic, the at least one second part of the header comprises at least one information element representative of the allocation of at least one frame interval to the at least one first mobile terminal.

Advantageously, the method for reception comprises at least one first physical channel estimation based on at least a first pilot associated with the at least a first part of the header and at least one second physical channel estimation based on at least a second pilot associated with the at least one second header part.

4. LIST OF FIGURES

Figure 2:
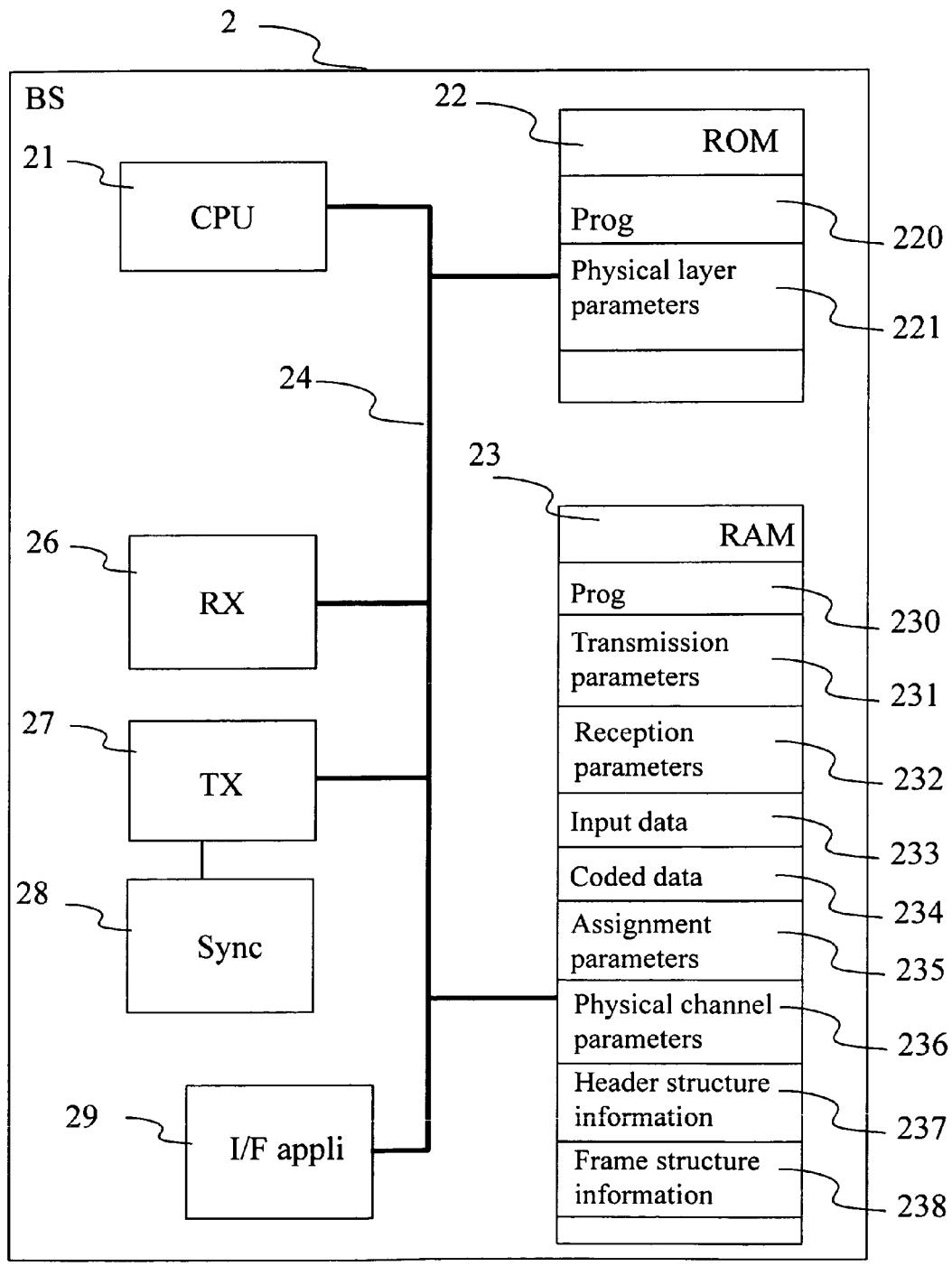
Figure 3:
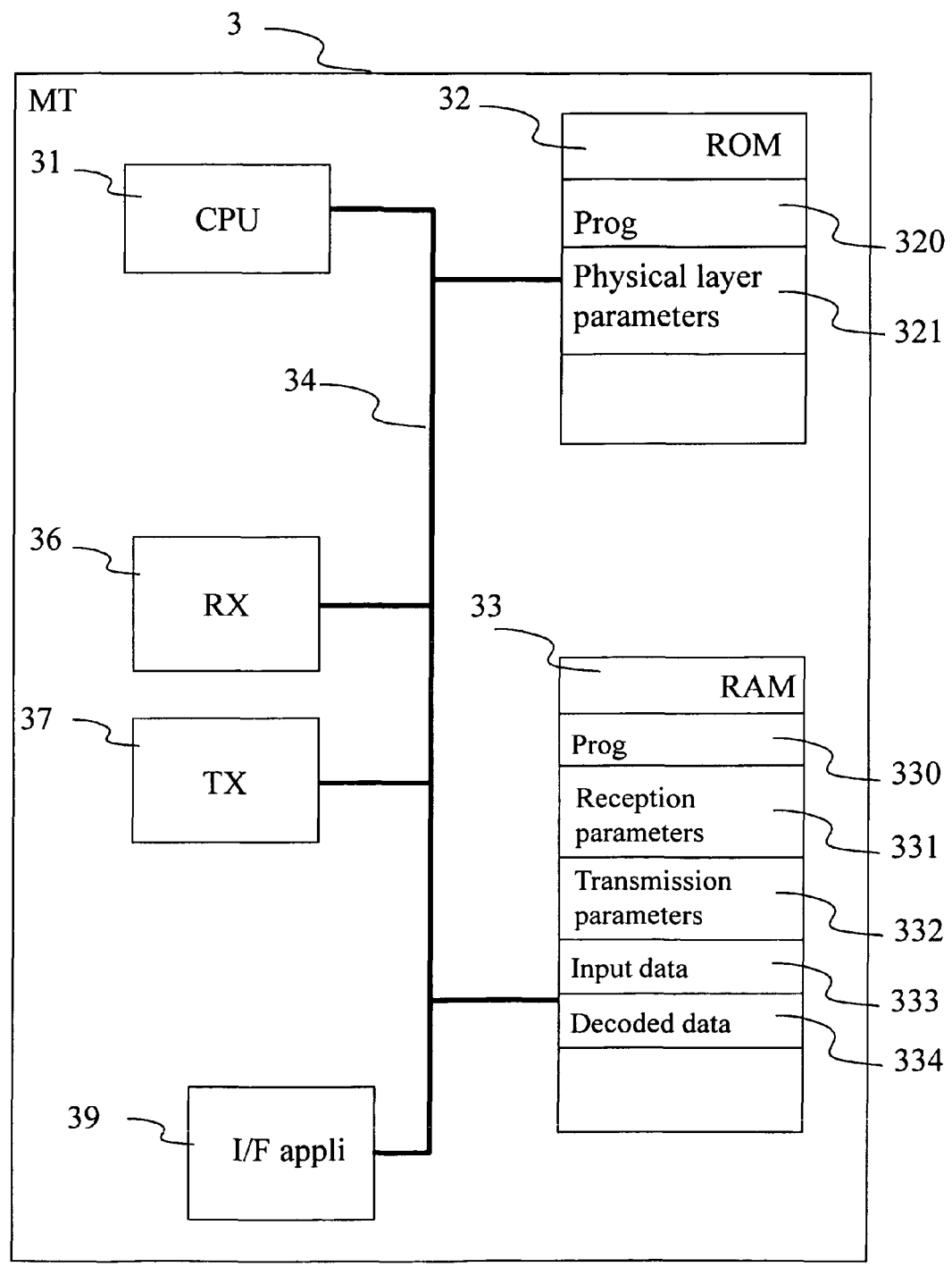
Figure 4A:
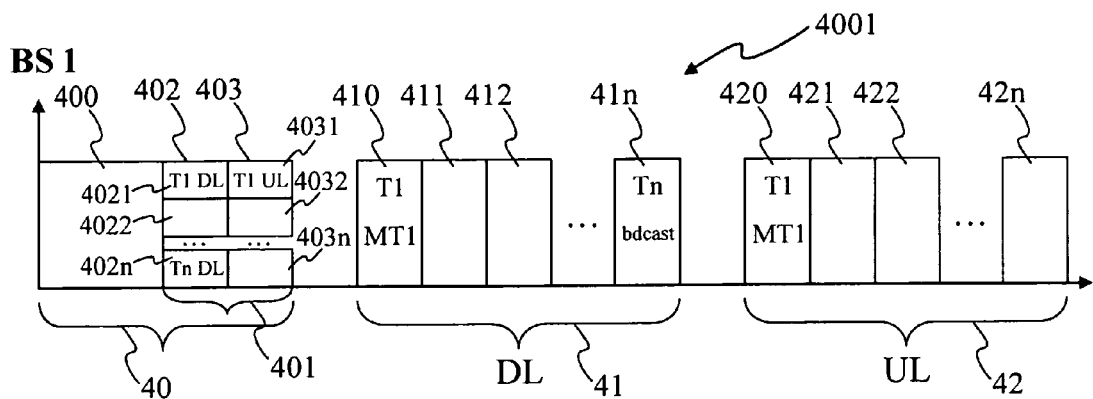
Figure 4B:
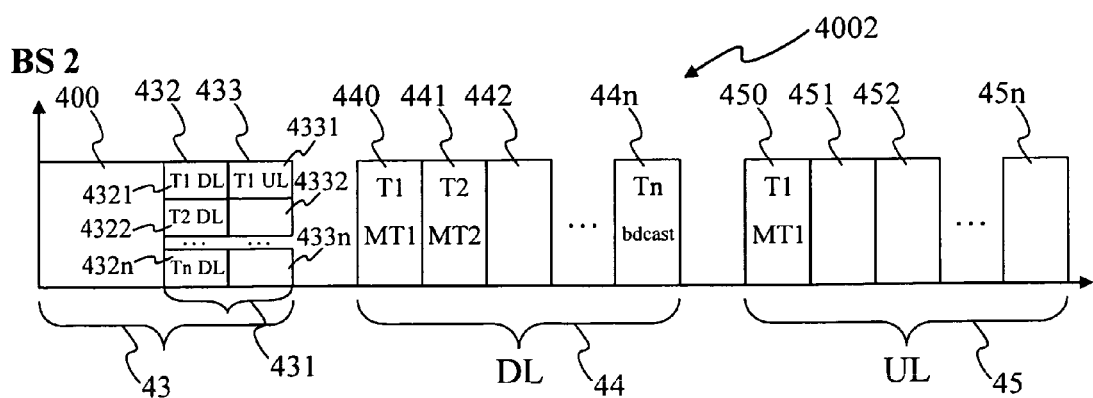
Figure 4C:
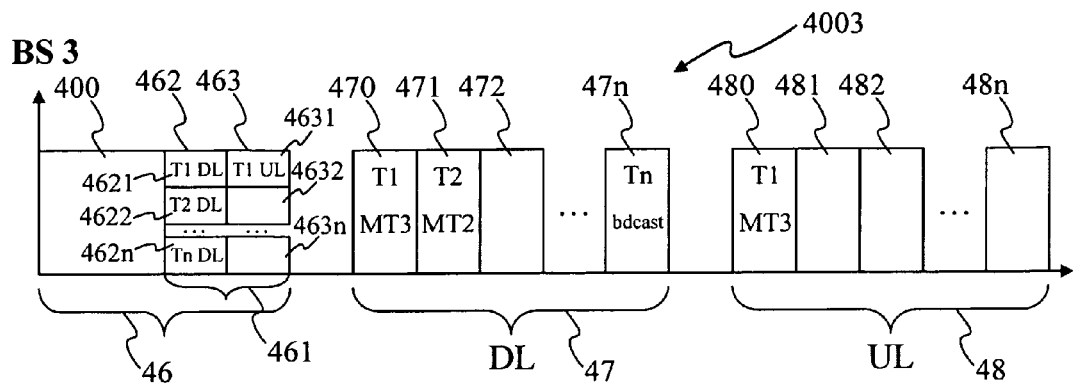
Figure 4D:
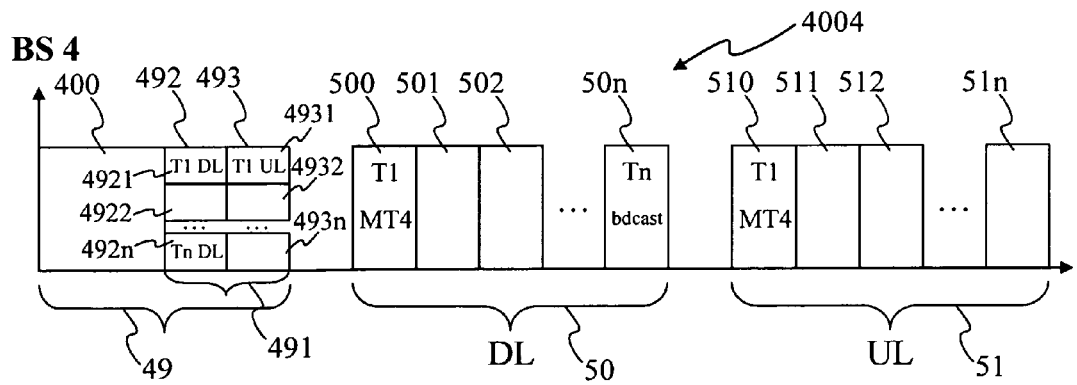
Figure 5A:
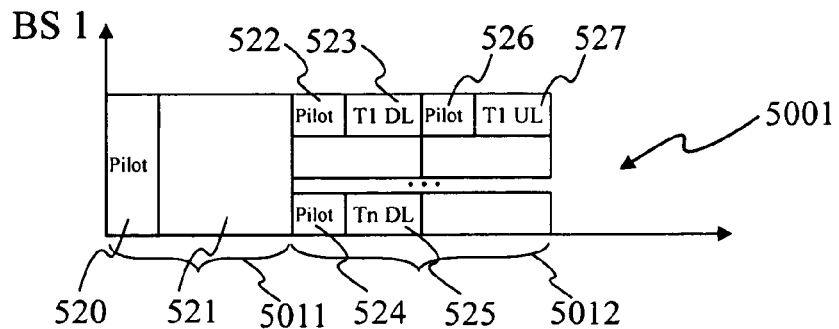
Figure 5B:
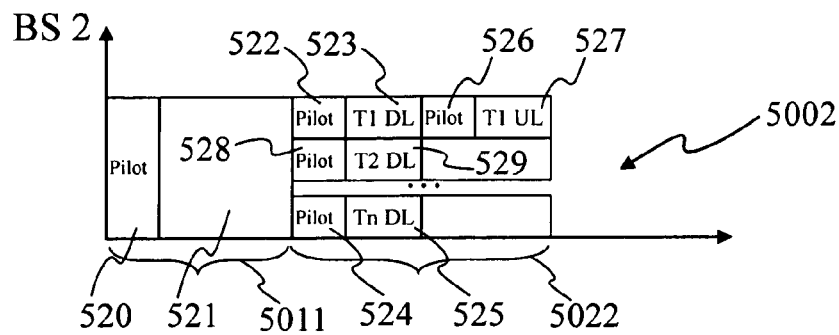
Figure 5C:
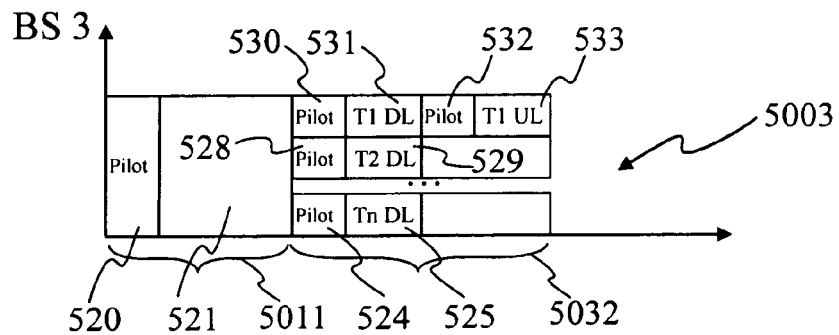
Figure 5D:
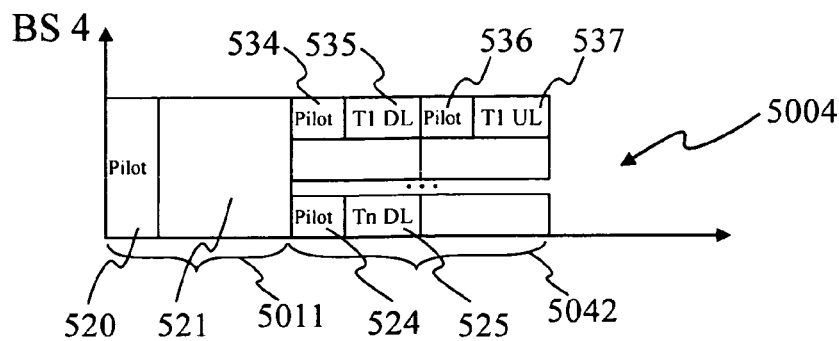
Figure 6:
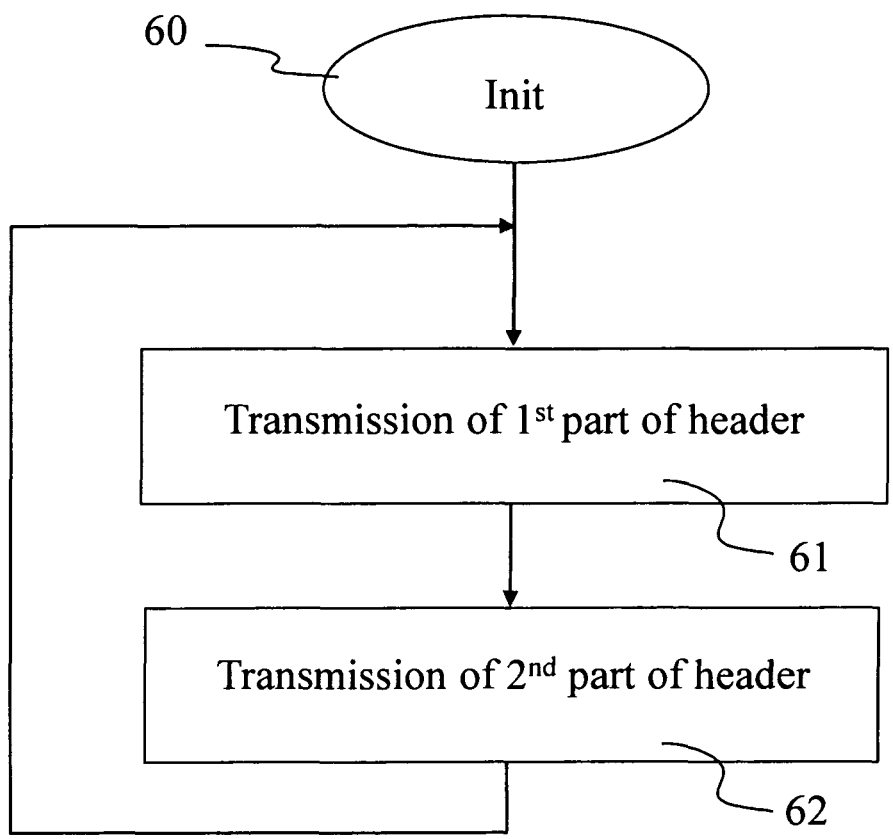
Figure 7:
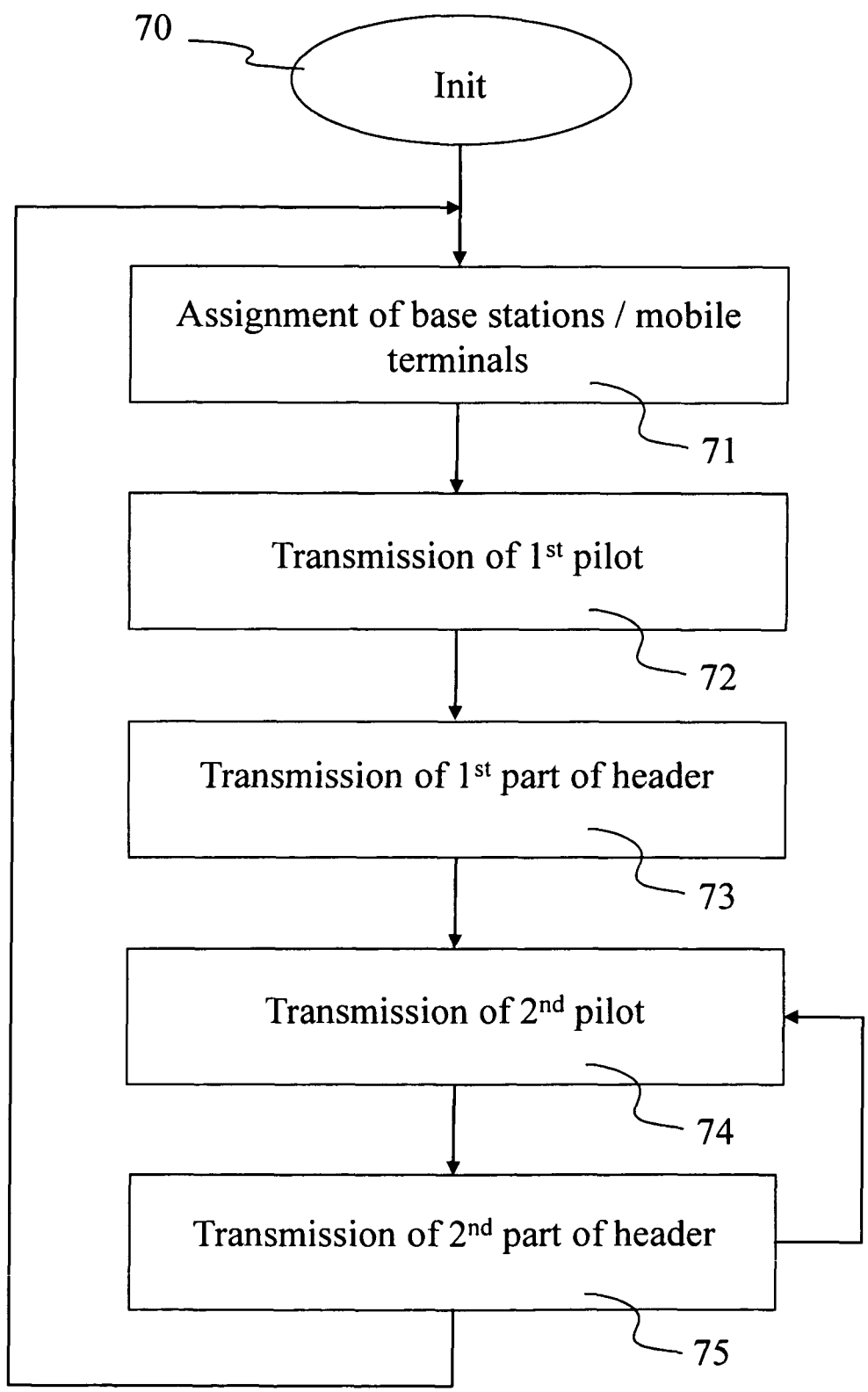
Figure 8:
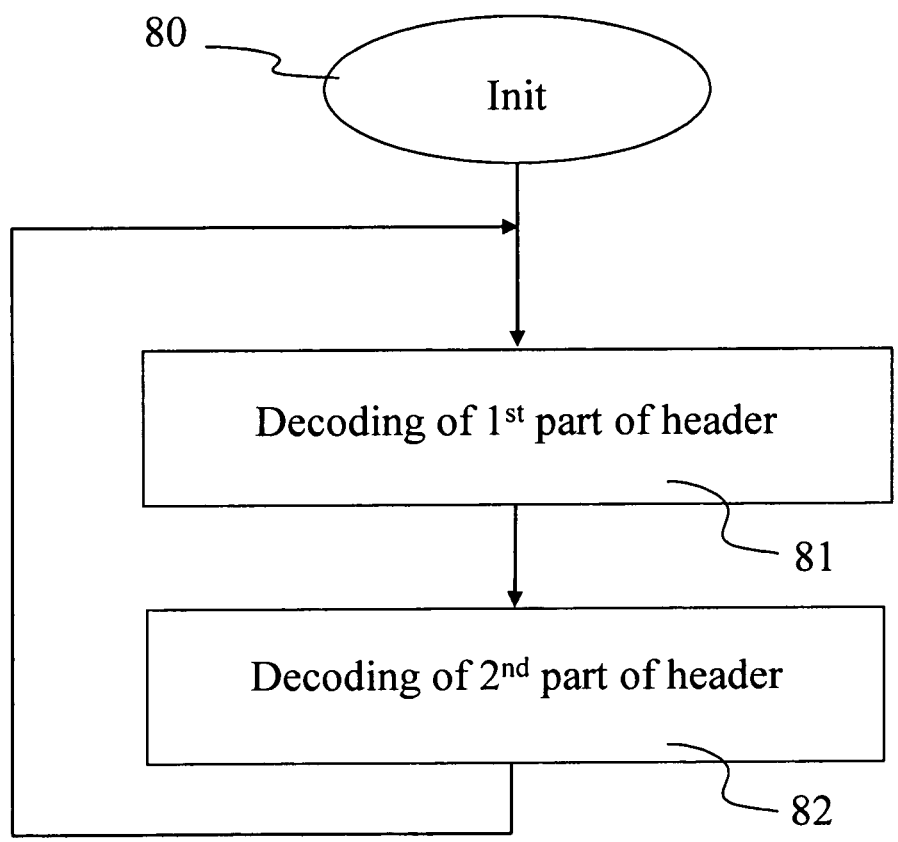
Figure 9:
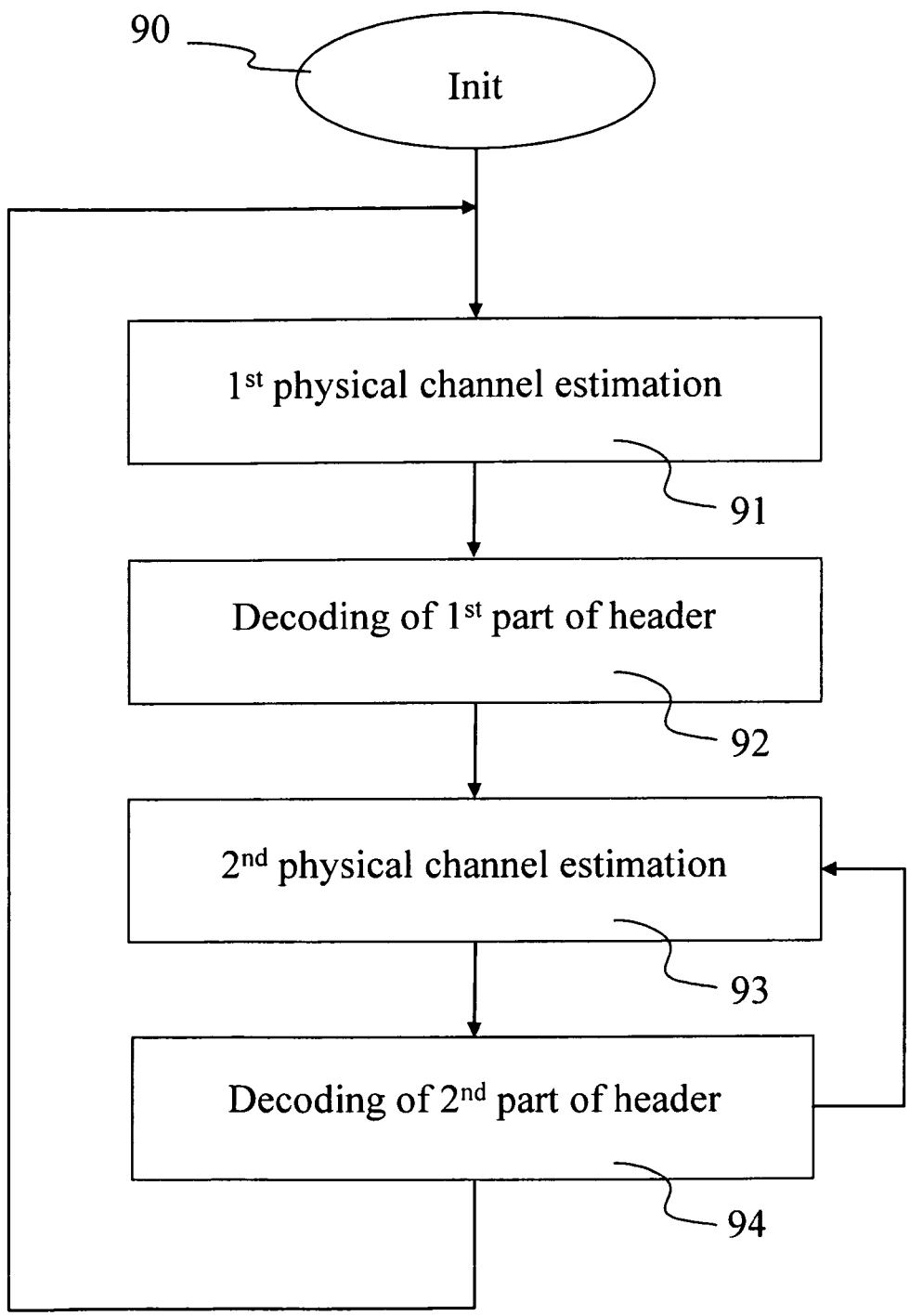

The invention will be better understood, and other specific features and advantages will emerge upon reading the following description, the description making reference to the annexed drawings wherein:

FIG. 1 shows a wireless network implementing several base stations and several mobile terminals, according to a particular embodiment of the invention, FIGS. 2 and 3 diagrammatically illustrate a respectively a base station and a mobile terminal of the system in FIG. 1, according to a particular embodiment of the invention, FIGS. 4a to 4d diagrammatically illustrate the structure of a communication frame at the level of respectively each of the base stations of system 1, according to a particular embodiment of the invention, FIGS. 5a to 5d diagrammatically illustrate the structure of a communication frame header at the level of respectively each of the base stations of system 1, according to a particular embodiment of the invention, FIGS. 6 and 7 show a transmission method implemented by one or more base stations of the system of FIG. 1, according to particular embodiments of the invention, and FIGS. 8 and 9 show a reception method implemented by a mobile terminal of the system of FIG. 1, according to particular embodiments of the invention.

5. DETAILED DESCRIPTION OF EMBODIMENTS OF THE INVENTION

FIG. 1 shows a wireless communications system 1 implementing several base stations 101, 102, 103, and 104 forming a first set of base stations and several mobile terminals 1001, 1002, 1003 and 1004 according to a particular embodiment of the invention. The base stations 101 to 104 transmit at a single frequency, that is to say that the base stations operate at a single frequency (that is to say with a negligible difference in frequency with regard to the OFDM system considered, typically less then 1 Hz for a DVB-T (Digital Video Broadcasting—Terrestrial) type system). The transmission at a single frequency by the set of base stations of the network enables dispensing with any "handover" mechanism at the level of the mobile terminal. The base stations 101 to 104 and the mobile terminals 1001 to 1004 each have a single transmission antenna. The base stations 101 and 102 communicate with the mobile terminal 1001 and form a second set of base stations that is included in the first set. The base stations 102 and 103 communicate with the mobile terminal 1002 and form a third set of base stations that is included in the first set. The base station 102 belongs to the second set and to the third set and thus communicates both with the mobile terminal 1001 and the mobile terminal 1002. The base station 101 belongs to the second set and not to the third and the base station 103 belongs to the third set and not to the second. The base station 104 belongs to the first set, without belonging to the second set or the third set. The base station 103 also communicates with the mobile terminal 1003. The base station 104 communicates with the mobile terminal 1004. The mobile terminals 1001 to 1004 are able to receive and decode the signal transmitted by the base stations 101 to 104 and the base stations 101 to 104 are able to receive and decode the signals transmitted by the mobile terminals 1001 to 1004. The zone 11, 12, 13 and 14 defined by the circles in dots represent the interference zones of respectively each of the base stations 101 to 104. Inside each of these zones 11 to 14, the levels of interference are less than a given threshold value and the levels of interference are greater than a given threshold value outside of these zones 11 to 14.

Advantageously, the mobile terminals 1001, 1002, 1003 and 1004 of system 1 are portable devices, for example portable telephones or terminals adapted to receive and process broadcast services (for example voice or audio data restitution and/or video data display, or more generally restitution, storage or processing of multimedia data).

Advantageously, the base stations 101 to 104 of the system 1 are fixed devices. The base stations are high powered transmitters adapted to broadcast data over a wide coverage area or average or low powered transmitters adapted to broadcast data over a more restricted coverage area. According to a variant, one at least of the base stations 101 to 104 forms a system covering a "picocell" that is to say a small area, such as the interior of a building, a supermarket, a station, that is to say having a range of a few dozen meters (according to some embodiments, in a picocell, the range is advantageously less than 300 m). According to another variant, at least one of the base stations forms a system designed to cover a "femtocell" that is to say an area restricted to a smaller size than a picocell, such as a few rooms of a house or building, one floor of a building, a plane, that is to say having a range of a few meters (according to some embodiments, in a femtocell the range is advantageously less than 100 meters).

According to a variant, the base stations 101 to 104 are of SISO (Single Input Single Output) type and have only a single antenna. The base stations form a synchronized network transmitting to a given mobile terminal a same content at a same frequency, that is to say the base stations operate on a single frequency (that is to say with a negligible deviation in frequency with respect to the OFDM system considered (typically less than 1 Hz for a DVB-T type system)) in a synchronous manner (that is with a negligible temporal deviation (for example less than 1 μs) and without temporal sliding of a signal transmitted by a base station with respect to another signal transmitted by another base station), the transmission frequency being synchronized on the different base stations, for example by the reception of a reference frequency provided by an external element (for example by GPS (Global Positioning System) satellite or terrestrial broadcast station of a reference time or frequency).

According to another variant, the base stations 101 to 104 are of MIMO type and each have a MIMO coder and several antennas transmitting a MIMO signal. According to this variant, the base stations also form a synchronized network transmitting a same content intended for a given mobile terminal at a same frequency.

Advantageously some of the base stations of the system 1 are of SISO type and some are of MIMO type. According to this variant, the base stations also form a synchronized network transmitting a same content intended for a given mobile terminal at a same frequency.

According to another embodiment, the base stations of the first, second, and/or third base station sets of the system 1 form a cooperative MIMO system in which the base stations possess indifferently one or more antennas. Such a cooperative MIMO system uses antennas distributed over several base stations, that is to say that the signal transmitted is distributed spatially between several antennas that can belong to several base stations of a same sub-set. The complete signal, with all the spatial streams, is combined in the air to be received by the mobile terminal to which are assigned the base stations of the considered sub-set. The base stations of such a cooperative MIMO system also form a synchronized network transmitting a same content intended for the considered mobile terminal at a same frequency.

According to another variant, some base stations of the system 1 are of MIMO type, cooperative or not, and the others are of SISO type.

Advantageously, at least one of the mobile terminals 1001 to 1004 is of MIMO type and has several antennas.

According to a variant, the areas 11 to 14 define the coverage areas of respectively each of the base stations 101 to 104.

FIG. 2 shows diagrammatically a hardware embodiment of a base station 2 corresponding for example to the base stations 101 to 104 of FIG. 1

The base station 2 comprises the following elements, connected to each other by a bus 24 of addresses and data that also transports a clock signal:
- a microprocessor 21 (or CPU (Central Processing Unit)),
- a non-volatile memory of ROM (Read Only Memory) type 22,
- a Random Access Memory or RAM 23,
- a radio interface 26,
- an interface 27 adapted for the transmission of data (for example broadcasting of services or multipoint to point or point to point transmission) and performing notably the functions of a coder and/or OFDM modulators,
- an interface 28 adapted to receive a synchronisation signal and to synchronise the interface 27, and/or
- a MMI (Man Machine Interface) interface 29 or to a specific application suitable for displaying information for a user and/or inputting data or parameters (for example the setting of parameters of sub-carriers and of data to be transmitted).

It is noted that the word "register" used in the description of memories 22 and 23 designates in each of the memories mentioned, both a memory zone of low capacity (some binary data) as well as a memory zone of large capacity (enabling a whole programme to be stored or all or part of the data representative of data received or to be broadcast).

The memory ROM 22 comprises in particular:
a "prog" 220 program, and
parameters 221 of physical layers.

The algorithms implementing the steps of the method specific to the invention and described hereafter are stored in the memory ROM 22 associated with the base station 2 implementing these steps. When powered up, the microprocessor 21 loads and runs the instructions of these algorithms.

The random access memory 23 notably comprises:
- in a register 230, the operating programme of the microprocessor 21 responsible for switching on the base station 2,
- the transmission parameters 231 (for example parameters for modulation, encoding, MIMO, recurrence of frames),
- the reception parameters 232 (for example parameters for modulation, encoding, MIMO, recurrence of frames),
- incoming data 233,
- coded data 234 for transmission of data,
- assignment parameters 235 of the base station to one or more mobile terminals (for example the number of assigned mobile terminals, the maximum number of base stations assigned, the quality of the link between the base station and the assigned mobile terminal, the efficiency in bitrate of the base stations, the localization of a mobile terminal),
- physical channel parameters 236 (for example allocation of determined temporal intervals, of a determined code and/or intervals of sub-carriers determined at the transmission of data by the base station 2),
- an item of information representative of the structure of a communication frame header transmitted by the base station 2, and
- an item of information representative of the structure of the communication frame (for example a description of the allocation of temporal, frequency and/or spatial intervals to one or more mobile terminals).

According to a variant, the base station 2 comprises in the RAM a register corresponding to the geographical position of the mobile terminals.

The radio interface 26 is adapted for the reception of signals broadcast where appropriate by the mobile terminals 1001, 1002, 1003 and 1004 of the system 1.

FIG. 3 diagrammatically illustrates a hardware embodiment of a mobile terminal 3 belonging to the system 1, corresponding for example to the mobile terminals 1001, 1002, 1003 and 1004 and adapted to receive and decode the signals transmitted by the base station 2.

The mobile terminal 3 comprises the following elements, connected to each other by a bus 34 of addresses and data that also transports a clock signal:
- a microprocessor 31 (or CPU),
- a non-volatile memory of ROM (Read Only Memory) type 32,
- a Random Access Memory or RAM 33,
- a radio interface 36,
- an interface 37 adapted for the transmission of data, and an MMI interface 39 adapted for displaying information for a user and/or inputting data or parameters (for example the setting of parameters of sub-carriers and data transmitted).

It is noted that the word "register" used in the description of memories 32 and 33 designates in each of the memories mentioned, a memory zone of low capacity as well as a memory zone of large capacity (enabling a whole programme to be stored or all or part of the data representing data sets received or decoded).

The memory ROM 32 comprises notably:

a "prog" 320 program, and parameters 321 of physical layers.

The algorithms implementing the steps of the method specific to the invention and described below are stored in the ROM 32 memory associated with the mobile terminal 3 implementing these steps. When powered up, the microprocessor 31 loads and runs the instructions of these algorithms.

The random access memory 33 notably comprises:

in a register 330, the operating programme of the microprocessor 31 responsible for switching on the mobile terminal 3, the reception parameters 331 (for example parameters for modulation, encoding, MIMO, recurrence of frames), the transmission parameters 332 (for example parameters for modulation, encoding, MIMO, recurrence of frames), incoming data 333 corresponding to the data received and decoded by the receiver 36, and decoded data 334 formed to be transmitted at the interface to the application 39.

Other structures of the base station 2 and/or of the mobile terminal 3 than those described with respect to the FIGS. 2 and 3 are compatible with the invention. In particular, according to variants, base stations and/or mobile terminals compatible with the invention are implemented according to a purely hardware embodiment, for example in the form of a dedicated component (for example in an ASIC (Application Specific Integrated Circuit) or FPGA (Field-Programmable Gate Array) or VLSI (Very Large Scale Integration)) or of several electronic components integrated into a device or even in a form of a combination of hardware elements and software elements.

The radio interface 36 is adapted for the reception of signals broadcast by the base stations 101 to 104 of the system 1.

The FIGS. 4a to 4d respectively show the structure of a communication frame representative of the exchange of bursts at the level of each of the base stations BS1 101, BS2 102, BS3 103 and BS4 104 of the system of FIG. 1, according to a particularly advantageous non-restrictive embodiment of the invention.

FIG. 4a shows a communication frame 4001 representative of burst exchanges between the base station BS1 on one hand and the mobile terminals of the network on the other. The frame 4001 comprises a frame header 40, a series of intervals DL 41 allocated for the downlink, that is to say for the transmission of bursts by a base station to one or more mobile terminals and a series of intervals UL 42 allocated for the uplink, that is to say for the reception of bursts transmitted by one or more mobile terminals. The frame header comprises two parts: a first part 400 of the frame header common to the set of base stations BS1, BS2, BS3 and BS4 of the network, corresponding to the first set of base stations BS1, BS2, BS3 and BS4 on a same first physical channel and a second part 401 specific to the base station BS1 transmitted on a second physical channel. A physical channel is characterized by a group of parameters comprising a list of sub-carriers, a temporal interval, a level of interference and in the case of a CDMA (Code Division Multiple Access) access, a same spread code. The first physical channel is advantageously different from the second physical channel in that it uses a different temporal interval, that is to say the first part of the header is transmitted on at least one second temporal interval different from the first temporal interval. The first part of the header 400 comprises an item of information representative of the structure of the frame, that is to say for example a description of the sequence of DL and UL intervals composing the frame and the second part of the header 401. Such a description comprises for example information representative of start and end times of each interval, the duration of the frame, the descending (DL) or ascending (UL) character of the intervals, the sub-carriers allocated for the communication of each of the bursts associated with each of the intervals in the case of an OFDMA (Orthogonal Frequency-Division Multiple Access) modulation of the spread code of the spectrum used in the case of a CDMA (Code Division Multiple Access) modulation. The second part of the header 401 comprises two intervals (or mini-intervals) 402 and 403 comprising information elements representative of the allocation of payload intervals of the frame, respectively DL and UL, to at least one mobile terminal MT1 1001. The mini-intervals 402 and 403 each advantageously correspond to an OFDM symbol. The first symbol OFDM 402 is divided into several parts (into n parts, n being an integer greater than or equal to 2, for example 16, 60 or 240, for an FFT (Fast Fourrier Transform) size of 2048 points and a block size of 32 sub-carriers, 60 parts are obtained and 240 parts are obtained for a block size of 8 sub-carriers), sub-carriers being associated with each part. A first part 4021 of the OFDM symbol comprises an item of information representative of the allocation of a first interval of the frame T1 410 in downlink DL to the mobile terminal MT1, a second part 4022 is left vacant and an $n^{th}$ part 402n comprises an item of information representative of the allocation of an $n^{th}$ interval Tn 41n in DL for the broadcasting of a burst intended for the set of mobile terminals of the network. The second symbol OFDM 403 is also divided into n parts, a number of sub-carriers being associated with each part. The first part 4031 comprises an item of information representative of the allocation of a first interval T1 420 in uplink (UL) to the mobile terminal MT1, the remaining (n−1) intervals 4032 to 403n being left vacant, that is to say that no signal is transmitted on the sub-carriers of this symbol OFDM. The information elements representative of the allocation of frame intervals to at least the mobile terminal MT1 advantageously comprise an identifier of the mobile terminal to which the interval is allocated and an identifier of the allocated interval. According to a variant, the identifier of the allocated interval is an item of information of pointer type pointing to the part, describing the allocated interval, of the information representative of the structure of the frame comprised in the first part of the header. The information elements representative of the allocation of intervals thus make reference to at least one part of the information representative of the structure of the frame comprised in the first part of the header. The rest of the frame comprises the intervals DL and UL transporting the payload. In downlink DL, the first interval 410 is allocated to the communication of a burst of data from BS1 to the mobile terminal MT1, the intervals 411, 412 to 41(n−1) are not allocated and the last interval 41n is allocated for the broadcasting by the set of base stations of the network BS1 to BS4 of a burst intended for all the mobile terminals MT1 to MT4 of the network. In the uplink UL, the first interval 420 is allocated to the reception by BS1 and BS2, that form the second set of base stations, in communication with MT1, of a burst transmitted by the mobile terminal MT1. The other intervals of the uplink UL 421, 422 to 42n are not allocated.

FIG. 4b shows a communication frame 4002 representative of burst exchanges between the base station BS2 on one hand and the mobile terminals of the network on the other. The frame 4002 comprises a frame header 43, a series of intervals DL 44 allocated for the downlink communication and a series of intervals UL 45 allocated for the uplink communication. The header 43 also comprises the same first header part 400, that is to say the content of the first part is the same for all the base stations transmitting it, transmitted synchronously by the first set of base stations (BS1 to BS4) on the first physical channel and a second header part 431 transmitted by the base station BS2 synchronously with the second header part 401 transmitted by BS1, for which the content varies with respect to the content of the second header part 401 transmitted by BS1. The second header part 431 comprises two intervals (or mini-intervals) 432 and 433 comprising information elements representative of the allocation of intervals of the payload of the frame respectively DL and UL, to the mobile terminals MT1 1001 and MT2 1002 notably. The mini-intervals 432 and 433 each advantageously correspond to an OFDM symbol. The first mini-interval 432 is divided into n parts, a number of sub-carriers being allocated to each part in accordance with the OFDM. A first part 4321 of the symbol OFDM 432 comprises an item of information representative of the allocation of a first interval of the frame T1 440 in downlink DL to the mobile terminal MT1, a second part 4322 comprises an item of information representative of the allocation of a second interval of the payload of the frame T2 441 to the mobile terminal MT2 and an $n^{th}$ part 402n comprises an item of information representative of the allocation of an $n^{th}$ interval Tn 44n in DL for the broadcasting of a burst intended for the set of mobile terminals of the network. The second mini-interval 433 is also divided into n parts, a number of sub-carriers being associated with each part. The first part 4331 of the symbol OFDM 433 comprises an item of information representative of the allocation of a first interval T1 420 in uplink (UL) with the mobile terminal MT1, the remaining (n−1) intervals 4032 to 403n being left vacant. The rest of the frame comprises the DL and UL intervals transporting the payload. In the downlink DL, the first interval 440 is allocated to the communication of a burst of data from BS2 to the mobile terminal MT1, this burst also being transmitted synchronously by BS1 that is also in communication with MT1, the second interval 441 is allocated to the communication of a burst of data from BS2 to the mobile terminal MT2 and the last interval 44n is allocated for the broadcasting by the set of base stations of the network BS1 to BS4 of a burst intended for all the mobile terminals MT1 to MT4 of the network. In the uplink UL, the first interval 450 is allocated to the reception by BS2 and BS1, that form the second set of base stations, in communication with MT1, of a burst transmitted by the mobile terminal MT1. The other intervals of the uplink UL 421, 422 to 42n are not allocated.

FIG. 4c shows a communication frame 4003 representative of burst exchanges between the base station BS3 on one hand and the mobile terminals of the network on the other. The frame 4003 comprises a frame header 46, a series of intervals DL 47 allocated for the downlink communication and a series of intervals UL 48 allocated for the uplink communication. The header 46 also comprises the same first header part 400 transmitted synchronously by the first set of base stations (BS1 to BS4) on the first physical channel and a second header part 461 transmitted by the base station BS3 synchronously with the second header part 401 transmitted by BS1 and BS2, for which the content varies with respect to the content of the second header part 401 transmitted by BS1 and/or BS2. The second header part 461 comprises two intervals (or mini-intervals) 462 and 463 comprising information elements representative of the allocation of intervals of the payload of the frame respectively DL and UL, to the mobile terminals MT2 1002 and MT3 1003 notably. The mini-intervals 462 and 463 each advantageously correspond to an OFDM symbol. The first mini-interval 462 is divided into n parts, a number of sub-carriers being allocated to each part in accordance with the OFDM. A first part 4621 of the symbol OFDM 462 comprises an item of information representative of the allocation of a first interval of the payload of the frame T1 470 in downlink DL to the mobile terminal MT3, a second part 4622 comprises an item of information representative of the allocation of a second interval of the payload of the frame T2 471 to the mobile terminal MT2 and an $n^{th}$ part 402n comprises an item of information representative of the allocation of an $n^{th}$ interval Tn 47n in DL for the broadcasting of a burst intended for the set of mobile terminals of the network. The second mini-interval 463 is also divided into n parts, a number of sub-carriers being associated with each part. The first part 4631 of the symbol OFDM 463 comprises an item of information representative of the allocation of a first interval T1 420 in uplink (UL) with the mobile terminal MT3, the remaining (n−1) intervals 4632 to 403n being left vacant. The rest of the frame comprises the DL and UL intervals transporting the payload. In the downlink DL, the first interval 470 is allocated to the communication of a burst of data from BS3 to the mobile terminal MT3, the second interval 471 is allocated to the communication of a burst of data from BS3 to the mobile terminal MT2, this burst being also transmitted synchronously by BS2 that is itself also in communication with MT2 and the last interval 44n is allocated for the broadcasting by the set of base stations of the network BS1 to BS4 of a burst intended for all the mobile terminals MT1 to MT4 of the network. In the uplink UL, the first interval 480 is allocated to the reception by BS3 of a burst transmitted by the mobile terminal MT3. The other intervals of the uplink UL 481, 482 to 48n are not allocated.

FIG. 4d shows a communication frame 4004 representative of burst exchanges between the base station BS4 on one hand and the mobile terminals of the network on the other. The frame 4004 comprises a frame header 49, a series of intervals DL 50 allocated for the downlink communication and a series of intervals UL 51 allocated for the uplink communication. The header 49 also comprises the same first header part 400 transmitted synchronously by the first set of base stations (BS1 to BS4) on the first physical channel and a second header part 491 transmitted by the base station BS4 synchronously with the second header part 401, 431, 461 transmitted by BS1, BS2 and BS3, for which the content varies with respect to the content of the second header part 401, 431, 461 transmitted by BS1, BS2 and BS3. The second header part 491 comprises two intervals (or mini-intervals) 492 and 493 comprising information elements representative of the allocation of intervals of the payload of the frame respectively DL and UL, to the mobile terminal MT4 1004 notably. The mini-intervals 492 and 493 each advantageously correspond to an OFDM symbol. The first mini-interval 492 is divided into n parts, a number of sub-carriers being allocated to each part in accordance with the OFDM. A first part 4921 of the symbol OFDM 492 comprises an item of information representative of the allocation of a first interval of the frame payload T1 500 in downlink DL to the mobile terminal MT4, a second part 4922 being left vacant and an $n^{th}$ part 402n comprises an item of information representative of the allocation of an $n^{th}$ interval Tn 49*n* in DL for the broadcasting of a burst intended for the set of mobile terminals of the network. The second mini-interval 493 is also divided into n parts, a number of sub-carriers being associated with each part. The first part 4931 of the symbol OFDM 493 comprises an item of information representative of the allocation of a first interval T1 510 in uplink UL with the mobile terminal MT4, the remaining (n−1) intervals 4932 to 493*n* being left vacant. The rest of the frame comprises the DL and UL intervals transporting the payload. In downlink DL, the first interval 500 is allocated to the communication of a burst of data from BS4 to the mobile terminal MT4, the intervals 501, 502 to 50(*n*−1) are not allocated and the last interval 50*n* is allocated for the broadcasting by the set of base stations of the network BS1 to BS4 of a burst intended for all the mobile terminals MT1 to MT4 of the network. In the uplink UL, the first interval 510 is allocated to the reception by BS4 of a burst transmitted by the mobile terminal MT4. The other intervals of the uplink UL 511, 512 to 51*n* are not allocated.

According to a variant, the mini-intervals comprised in the second part of the frame header do not correspond to an OFDM symbol and correspond to intervals distributed in time. Each information element comprised in these mini-intervals thus corresponds advantageously to a mini temporal interval.

The FIGS. 5*a* to 5*d* respectively show the structure of a communication frame header at the level of each of the base stations BS1 101, BS2 102, BS3 103 and BS4 104 of the system of FIG. 1, according to a particularly advantageous non-restrictive embodiment of the invention.

FIG. 5*a* shows a communication frame header 5001 transmitted by the station BS1. The header 5001 comprises two parts, a first header part 5011 and a second header part 5012. The first header part 5011 comprises a first pilot 520, that is to say a signal enabling a receiver to estimate the propagation conditions of the received signal, and a part 521 comprising an item of information representative of the structure of the frame, comprising for example a description of the structure of the second header part 5012 and a description of the structure of the payload of the frame. The second header part 5012 comprises mini-intervals each containing information elements representative of the allocation of intervals of the payload of the frame in DL and UL to the mobile terminals of the network. Thus, a first OFDM symbol is divided into n parts 523 and 525, n being an integer greater than or equal to 1. The first information element 523 of the first OFDM symbol is representative of the allocation of the first interval DL 410, 440 of the payload of the frame to MT1 and the last information element 525 is representative of the allocation of the last interval DL 41*n*, 44*n* and 50*n* for the broadcasting of a burst by the set of base stations BS1 to BS4 intended for the set of mobile terminals MT1 to MT4 of the network. The second OFDM symbol comprises a first information element 527 representative of the allocation of the first interval 420, 450 of the payload UL of the frame to MT1. Each information element 523, 525, 527 is preceded respectively by a pilot 522, 524, 526.

FIG. 5*b* shows a communication frame header 5002 transmitted by the station BS2. The header 5002 comprises two parts, a first header part 5011 and a second header part 5022. The first header part 5011 comprises a first pilot 520 and a part 521 comprising an item of information representative of the structure of the frame, comprising for example a description of the structure of the second header part 5012 and a description of the structure of the payload of the frame. The second header part 5022 comprises mini-intervals each containing information elements representative of the allocation of intervals of the payload of the frame in DL and UL to the mobile terminals of the network. Thus, a first OFDM symbol is divided into n parts 523, 525 and 529. The first information element 523 of the first OFDM symbol is representative of the allocation of the first interval DL 410, 440 of the payload of the frame to MT1, the information element 529 is representative of the allocation of the second interval 441, 471 of the frame to MT2 and the last information element 525 is representative of the allocation of the last interval DL 41*n*, 44*n*, 47*n* and 50*n* for the broadcasting of a burst by the set of base stations BS1 to BS4 intended for the set of mobile terminals MT1 to MT4 of the network. The second OFDM symbol comprises a first information element 527 representative of the allocation of the first interval 420, 450 of the payload UL of the frame to MT1. Each information element 523, 525, 527 and 529 is preceded respectively by a pilot 522, 524, 526 and 528.

FIG. 5*c* shows a communication frame header 5003 transmitted by the station BS3. The header 5003 comprises two parts, a first header part 5011 and a second header part 5032. The first header part 5011 comprises a first pilot 520 and a part 521 comprising an item of information representative of the structure of the frame, comprising for example a description of the structure of the second header part 5032 and a description of the structure of the payload of the frame. The second header part 5032 comprises mini-intervals each containing information elements representative of the allocation of intervals of the payload of the frame in DL and UL to the mobile terminals of the network. Thus, a first OFDM symbol is divided into n parts 531, 529 and 525. The first information element 531 of the first OFDM symbol is representative of the allocation of the first interval DL 470 of the payload of the frame to MT3, the information element 529 is representative of the allocation of the second interval 441, 471 of the frame to MT2 and the last information element 525 is representative of the allocation of the last interval DL 41*n*, 44*n*, 47*n* and 50*n* for the broadcasting of a burst by the set of base stations BS1 to BS4 intended for the set of mobile terminals MT1 to MT4 of the network. The second OFDM symbol comprises a first information element 533 representative of the allocation of the first interval 480 of the payload UL of the frame to MT3. Each information element 531, 525, 529 and 533 is preceded respectively by a pilot 530, 524, 528 and 532.

FIG. 5*d* shows a communication frame header 5004 transmitted by the station BS4. The header 5004 comprises two parts, a first header part 5011 and a second header part 5042. The first header part 5011 comprises a first pilot 520 and a part 521 comprising an item of information representative of the structure of the frame, comprising for example a description of the structure of the second header part 5042 and a description of the structure of the payload of the frame. The second header part 5042 comprises mini-intervals each containing information elements representative of the allocation of intervals of the payload of the frame in DL and UL to the mobile terminals of the network. Thus, a first OFDM symbol is divided into n parts 535 and 525. The first information element 535 of the first OFDM symbol is representative of the allocation of the first interval DL 500 of the payload of the frame to MT4 and the last information element 525 is representative of the allocation of the last interval DL 41*n*, 44*n*, 47*n* and 50*n* for the broadcasting of a burst by the set of base stations BS1 to BS4 intended for the set of mobile terminals MT1 to MT4 of the network. The second OFDM symbol comprises a first information element 537 representative of the allocation of the first interval 510 of the payload UL of the frame to MT4. Each information element 535, 525 and 537 is preceded respectively by a pilot 534, 524 and 536.

The first header part 5011 is advantageously transmitted synchronously by the set of base stations, at a same frequency on a first physical channel. The pilot 520 transmitted before the transmission of the interval 521 thus enables all mobile terminals receiving it to estimate the channel response and to receive and correctly decode the interval 521. As the interval 521 comprises information representative of the structure of the second part of the header 5012, 5022, 5032 and 5042 and the structure of the frame payload, this implies that the structure of the second part of the header is common to all the base stations transmitting it. Only the content of the second part of the header varies according to the emitting base station. The same reasoning applies to the structure of the payload of the communication frame.

As the first header part and the mini-intervals are not transmitted by the same sets of base stations, the propagation channel varies between the transmission of the first header part and the transmissions of the mini-intervals. A mobile terminal trying to decode received signals must carry out a channel estimation before each header part and more generally before each mini-interval. The first header part and each mini-interval therefore comprises a pilot sequence such that any receiver and any mobile terminal calculates the new propagation channel response, according to any of the techniques known to those skilled in the art. The pilot sequence is advantageously constituted of an OFDM symbol preceding the OFDM symbol comprising the mini-interval data. According to a variant, the pilot sequence is comprised in the same OFDM symbol as that comprising the mini-interval data, some sub-carriers of the OFDM symbol being used to transport the pilot sequence. In this case, the complete estimation of the propagation channel is carried out by interpolating the frequency response onto the other sub-carriers transporting the mini-interval data.

According to another variant, the mini-intervals of the second part of the frame header are advantageously grouped when they share the same physical channel, that is to say notably when they are transmitted by the same base stations. This is for example the case for the mini-intervals comprising information representative of the allocation of intervals to MT1 for the base stations of the second set comprising the base stations BS1 and BS2 or for the mini-intervals comprising information representative of the allocation of intervals to MT2 for the base stations of the third set comprising the base stations BS2 and BS3. This variant offers the advantage of optimising the bandwidth and improving the performance of the system 1.

FIG. 6 shows a method for transmitting implemented in at least two sets of base stations, one comprising at least two base stations 2 and the other comprising at least one base station 2, according to a particularly advantageous non-restrictive embodiment of the invention.

During an initialisation step 60, the various parameters of each base station are updated. In particular, the parameters corresponding to the signals to be transmitted or received and to the corresponding sub-carriers are initialised in any manner (for example, following the reception of initialisation messages transmitted by one of the base stations, known as a master station or by a server not represented of system 1, or by operator commands).

Next, during a step 61, a first set comprising at least two base stations BS1 101, BS2 102, BS3 103 and BS4 104 synchronously transmit a first part of the frame header 400 on a first physical channel. The first header part advantageously comprises an item of information representative of the structure of the communication frame of system 1, that is to say a description of the structure of the header and of the payload of the frame. The first part of the header comprises for example a description of the mini-intervals comprising the second header part, that is to say information relating to the start and end times of the mini-intervals, to the sub-carriers allocated to each mini-interval, to the modulation type used (that is to say the level of modulation or the physical mode used comprising for example a QPSK (Quadrature Phase Shift Keying) or a 16QAM (Quadrature Amplitude Modulation) constellation type for example, use of one or more convolution/LDPC (Low Density Parity Check) type codes for example, use of a MIMO schema comprising for example a spatial multiplexing or STOBC (Space-Time Orthogonal Block Code), and a distribution of pilot sub-carriers) or to the pilot, and a description of payload intervals of the frame, that is to say for example uplink UL or downlink DL for each interval, start and end time of each interval, sub-carriers allocated in the case of the OFDMA, spread code used in the case of CDMA, frame duration, etc.

Then, during a step 62, a second set of base stations comprising at least one base station BS1 101 and BS2 102 synchronously transmit a second frame header part 401, 431 on a second physical channel. The structure of the second header part is the same, whichever base station transmits it. Advantageously the content of the second header part varies according to the transmitting base station. The second header part advantageously comprises one or more information elements representative of the allocation of DL or UL intervals of frame payloads to one or more mobile terminals. In the case of an OFDM modulation, the second header part advantageously comprises two mini-intervals each corresponding to an OFDM symbol comprising information relating to the allocation of frame payload intervals to one or more mobile terminals in communication with at least one base station of the second set of base stations. The first mini-interval is for example associated with information relating to the allocation of downlink DL intervals and the second mini-interval is for example associated with information relating to the allocation of uplink UL intervals. Using the OFDM properties, each OFDM symbol is divided into as many parts as there are intervals composing the downlink or uplink of the frame, according to the considered OFDM symbol. To each part of the OFDM symbol is then associated a number of sub-carriers transporting the information element relating to the allocation of an interval of the frame. Each information element representative of the allocation of an interval advantageously comprises an identifier of the mobile terminal to which is allocated the interval of the considered frame. According to a variant, the first part of the frame header including the description of the structure of the frame comprises an item of information representative of the association of an identifier with each frame interval, for example an ascending interval number. Each information element of the second header part thus makes reference to the first header part comprising the frame interval identifier: each information element of the second header part points to a part of the first header part describing the interval of the frame that is allocated to a given mobile terminal.

Advantageously the first physical channel and the second physical channel are different in that the first physical channel uses a first temporal interval, that is to say that the first header part is transmitted during a first temporal interval, and in that the second physical channel uses a second temporal interval different from the first temporal interval, that is to say that the second header part is transmitted during a second temporal interval different from the first. A physical channel being characterized by a group of parameters comprising a list of sub-carriers, a temporal interval, a level of interference and in the case of a CDMA (Code Division Multiple Access) access, a same spread code, the first and second physical channels are, according to a variant, different in that one or any combination of the parameters above is different.

According to a variant, the information representative of the structure of the payload of the frame is contained in the second header part, the first header part then comprising only an item of information representative of the structure of the second part of the frame header. According to this variant, each information element representative of the allocation of an interval of the payload of the frame of each mini-interval comprises an item of information representative of the interval allocated (duration, modulation used, start and end time, etc.).

Advantageously the first part of the frame header is transmitted by the set of base stations of the network, that is to say the first set, on a single and same first physical channel. The content of this first part of the frame header is identical, whichever the base station that transmits it. According to a variant, the physical channel used for the transmission of a mini-interval of the second header part is different according to the mini-interval. According to another variant, the physical channel used for the transmission of each information element comprised in the mini-intervals of the second part of the header differs according to the information element. The information elements representative of the allocation of intervals of the frame transmitted by at least two base stations of the second set are advantageously transmitted on the same second physical channel.

According to a particularly advantageous variant, a third set of base stations comprising at least two base stations BS2 102 and BS3 103 transmit the second header part, synchronously and at the same frequency as the second part. The structure of the second part of the frame header is therefore the same for all the sets of transmitting base stations. The content of the second header part varies from one set to another, and according to a variant from one base station to another. The second header part transmitted by the third set of base stations comprises one or more information elements representative of the allocation of one or more intervals of DL and/or UL payload of the frame or one or more second mobile terminals. The third set is included in the first set, while being different from the first set (particularly in that it does not comprise the base stations BS1 and BS4 of the first set). The second set and the third set have a base station in common, for example BS2. The second and third set are different (notably in that the second set does not comprise the base station BS3 and in that the third set does not comprise the base station BS1). The mobile terminal MT1 being in communication with the base stations BS2 and BS3, BS2 belonging both to the second set and the third set, some information elements representative of the allocation of intervals of the frame to MT1 and to MT2 are thus common to the second header parts transmitted by the second set and the third set. Hence, and to avoid any interference, the intervals allocated to MT1 and MT2 are different. The intervals allocated to MT1 and to MT2 are advantageously different in that they use different temporal intervals notably in the case of a TDMA (Time Division Multiple Access) modulation. According to a variant, the intervals allocated to MT1 and MT2 are different in that they use different sub-carriers in the case of an OFDMA modulation. According to another variant, the intervals allocated to MT1 and MT2 are different in that they use different spatial streams, a spatial stream corresponding to one of the signals transmitted by a MIMO transmitter using the spatial multiplexing technique to increase the transmission capacity. According to a variant, the intervals allocated to MT1 and MT2 are different in that any combination of TDMA, OFDMA and/or spatial modulation is applied to them.

FIG. 7 shows a method for transmitting implemented in at least two sets of base stations, one comprising at least two base stations 2 and the other comprising at least one base station 2, according to a particularly advantageous non-restrictive embodiment of the invention.

During an initialisation step 70, the various parameters of each base station are updated. In particular, the parameters corresponding to the signals to be transmitted or received and to the corresponding sub-carriers are initialised in any manner (for example, following the reception of initialisation messages transmitted by one of the base stations, known as a master station or by a server not represented of system 1, or by operator commands).

Then during a step 71, one or more mobile terminals are assigned to a set of base stations for the exchange of communication bursts. Such an assignment is notably described in the French patent application filed on Nov. 21, 2008 under the number FR0806545. The patent application FR0806554 describes a method for assigning each of the mobile terminals to a set of base stations according to at least one determined assignment parameter. The at least one assignment parameter belongs to a group of parameters comprising the following parameters:

number of mobile terminals assigned to a base station to be assigned: if the number of mobile terminals to which are assigned a base station looking to be assigned to a new mobile terminal is less than a threshold value, then the assignment of a new mobile terminal is made, and if the number of mobile terminals to which are assigned the base station looking to be assigned to a new mobile terminal is greater than said threshold value, then the assignment of a new mobile terminal is not made. Non-restrictive examples for the threshold value are: 5, 10, 20, 50, 100, 200, 300, etc. mobile terminals in communication (that is to say terminals that receive and process data that are intended for them). According to a variant, the threshold value takes into consideration mobile terminals in standby (that is to say terminals to which are assigned base stations but which are not in an active communication state, that is to say they are waiting for reception of data that are specifically intended for them) in addition to those in communication, for example 100, 500, 1000, etc. mobile terminals in standby. According to a variant, the threshold value takes into consideration the resources (for example bandwidth requirements) necessary to each of the mobile terminals. The account taken of this parameter offers notably the advantage of not saturating the network and of guarantying a quantity of bandwidth sufficient for each assigned mobile terminal.

maximum number of base stations assigned to a mobile terminal: a maximum number of base stations that can be assigned to a given mobile terminal is fixed (for example 3, 4, 5, etc.) and a new base station looking to be assigned to the mobile terminal under consideration can only do so if the maximum number of base stations assigned to said mobile terminal being considered has not been attained. If the maximum number of assigned base stations has been attained, a new base station looking to be assigned to the mobile terminal being considered can only do so it the assignment of an assigned base station is suppressed. According to a variant, the maximum number of base stations assigned to a given mobile terminal is comprised between:

the loss in efficiency on the bandwidth of the network formed by the base stations: to minimise the loss in efficiency, it is necessary to limit the number of base stations, the gain in reception of the mobile terminal due to the gain in diversity obtained in multiplying the base stations transmitting the same data synchronously at a single frequency intended for the mobile terminal. The account taken of this parameter offers notably the advantage of optimizing the utilization of base stations by avoiding that a too great number of base stations are assigned to a mobile terminal and enables for example to limit the number of base stations to be implemented in the network.

link quality between the base station to be assigned and the mobile terminal being considered: the link quality is for example estimated from measurements of the signal power received by the base station and transmitted by the mobile terminal, measurements carried out according to any technique known in the prior art. Advantageously, the base station having the best level of reception of the signal transmitted by the mobile terminal is assigned preferentially to the mobile terminal being considered, there where the additional base station(s) to be assigned to the mobile terminal being determined by order of the falling level of reception of the signal (starting from the best level). According to a variant, a base station with a level of reception less than a threshold value (for example less than 10, 15 or 20 dB with respect to the level of reception of the best base station) is not assigned. According to another variant, the frequency of the measurements of power carried out by the base station(s) receiving the signal transmitted by the mobile terminal increase (respectively diminish) when the SNR (Signal to Noise Ratio) diminishes (respectively increase). The account taken of this parameter offers notably the advantage of assigning to a mobile terminal only the base stations for which the signal transmitted will be effectively received for processing by the mobile terminal.

efficiency in bitrate of the base station to be assigned: if the bitrate offered by the base station to be assigned is greater than a threshold value, then the assignment is made if not the assignment fails. According to a variant, the total bitrate of the network formed by the base stations is taken into account to assign a base station: a base station for which the bitrate is greater than the threshold value is not for example assigned because it is the only one available to establish communication with another mobile terminal. The account taken of this parameter offers notably the advantage of guarantying a minimum bitrate to the mobile terminal.

localisation of the mobile terminal being considered: the base station or base stations for which the distance(s) with respect to the mobile terminal being considered is/are less than a threshold value is/are assigned to said mobile terminal. In the case of a picocell system, the threshold value takes non-restrictively the values 50, 100 or 200 m for example. In the case of a femtocell system, the threshold value takes non-restrictively the values 5, 10 or 50 m for example. It is understood by mobile terminal localisation its absolute geographical position or relative geographical position (with respect to the base stations). The position is determined for example by GPS or by measurement of the distances between each base station and the mobile terminal from a signal transmitted by the mobile terminal and received by the base stations, according to any technique known in the prior art. The account taken of this parameter offers notably the advantage of simplicity in its implementation.

The mobile terminal MT1 is thus assigned to the second set of base stations comprising BS1 and BS2, the mobile terminal is assigned to the third set of base stations comprising BS2 and BS3, the mobile terminal is assigned to the base station BS3 forming for example a fourth set and the mobile terminal MT4 is assigned to BS4 which forms for example a fifth set. The base station or base stations thus assigned to each mobile terminal are responsible for the transmission of data intended for the allocated mobile terminal(s) and the reception of data transmitted by the allocated mobile terminal(s).

Then during a step 72, a first pilot, that is to say a reference signal enabling the mobile terminals receiving it to estimate the propagation channel of the signal, is transmitted. The first pilot is transmitted synchronously by the set of base stations BS1 to BS4 of the first set on a same first physical channel. Advantageously the first pilot is constituted of an OFDM signal transmitted before the first part of the frame header. According to a variant, the first pilot is transmitted on a first temporal mini-interval before the interval corresponding to the transmission of the first part of the frame header. According to another variant, the first pilot is included in the same OFDM symbol as that transporting the data of the first header part, some of the sub-carriers of the OFDM symbol being allocated to the transmission of this first pilot.

Then during a step 73, at least one first header part is transmitted by the first set of base stations comprising the base stations BS1 101, BS2 102, BS3 103 and BS4 104. The step of transmission of the first header part is similar to step 61 described above for FIG. 4 and is not repeated in detail here.

Advantageously, during a step 74, a second pilot is transmitted before the transmission of the second header part. The content of the second header part varying according to the set of base stations that transmit it, or advantageously according to the base station that transmits it, advantageously a second pilot is transmitted for each information element representative of the allocation of intervals of the frame to the mobile terminals comprised in the second header part. Advantageously, the second pilot is constituted of an OFDM symbol transmitted before each mini-interval composing the second header part. According to a variant, the second pilot is constituted of part of an OFDM symbol transmitted after each information element representative of the allocation of intervals of the frame. According to another variant, a second pilot associated with a mini-interval or with an information element is comprised in the same OFDM symbol as respectively that comprising the mini-interval data or that comprising the data relating to the information element, some sub-carriers of the OFDM symbol being used to transport the second pilot. The complete estimation of the propagation channel by a mobile terminal is then carried out by interpolating the frequency response onto the other sub-carriers transporting the data of mini-intervals or of information elements.

Finally, during a step 75, the second header part is transmitted as described for step 62 of FIG. 5. The base stations of a set transmitting the second header part for which the content corresponds to the information representative of the allocation of intervals of the frame to the mobile terminal(s) assigned to the set under consideration. Hence, the content of the second header part is specific to the base station that transmits it according to the mobile terminal or mobile terminals that are assigned to it for communication. According to a variant, part of the second part is transmitted then the step 74 of transmission of a second pilot is again implemented for the transmission of another second pilot before the transmission of another part of the second header part. Advantageously, this scenario is repeated for all the mini-intervals or information elements comprised in the second header part.

FIG. 8 shows a method for reception implemented in a mobile terminal 3, according to a particularly advantageous non-restrictive embodiment of the invention.

During an initialisation step 80, the different parameters of the mobile terminal are updated. In particular, the parameters corresponding to the signals to be transmitted or received and those of the corresponding sub-carriers are initialised in any manner (for example, following the reception of initialisation messages transmitted by one of the base stations, known as master station or by a server not represented of system 1, or by operator commands).

Then during a step 81, the mobile terminal receives and decodes all or part of the first part of the communication frame header. The first header part being transmitted synchronously on a same first physical channel, that is to say at a same frequency, during a same first temporal interval or with a same spectrum spread code in the case of a CDMA access, by the first set of base stations BS1 to BS4, each mobile terminal MT1 to MT4 receives and decodes the first part of the frame header. Advantageously, the first part of the frame header comprises an item of information representative of the structure of the frame header and the structure of the payload of the frame, that is to say a description of the sequence of mini-intervals comprised in the frame header and a description of the intervals of the payload of the frame.

During a step 82, one or more mobile terminals receive and decode all or part of the second part of the frame header. The content of each mini-interval comprised in the second part of the header varying from one set of base stations to another, or advantageously from one base station to another, the coding (allocation of sub-carriers in OFDM or of a spectrum spread code in CDMA) applied to a mini-interval (or information element representative of the allocation of intervals of the payload) advantageously differs from one mini-interval to another, a given mobile terminal can only decode one part of the second header part. The size of a mini-interval being small, each mini-interval only contains a minimal number of items of information, such as for example the identifiers of the mobile terminal and/or the identifier of the interval allocated to this terminal mobile, only a part of an OFDM symbol is able to transport this information. By multiplexing the mini-intervals according to the OFDMA, it is thus possible to transmit several mini-intervals in a same OFDM symbol but on different sub-carriers. According to such a technique, the mobile terminal receiving such a signal detects which sub-carriers are active then decodes them and detects which mini-interval(s) (or information elements) are allocated to it. According to a particularly advantageous variant, a robust error protection schema, for example of FEC (Forward Error Correction) type is applied for the coding of mini-intervals to avoid particularly any erroneous decoding in the case where the mobile terminal would use an interval allocated to another mobile terminal. According to a variant, a given mobile terminal only decodes the mini-intervals (or information elements) received with a power level greater than a threshold value. In fact, the base stations BS1 and BS2 allocated for communication with a given mobile terminal MT1 being closer to the terminal than to other base stations BS3 and BS4 of the network, the mini-intervals allocated to the mobile terminal MT1 are received with a power level greater than the other mini-intervals transmitted by BS1 and BS2 but do not concern the mobile terminal MT1 under consideration. It is thus easy for a given mobile terminal to detect the mini-intervals that are intended for it from among the set of mini-intervals transmitted by the base stations, and more generally among the interferences provoked by other base stations transmitting other mini-intervals (or information elements) to other mobile terminals. Referring to FIGS. 4a to 4d and 5a to 5d, the mobile terminal MT1 detects and decodes the mini-intervals (or information elements) 523, 525 and 527 transmitted by the base stations of the second set of base stations, the mobile terminal MT2 detects and decodes the mini-intervals 529 and 525 transmitted by the base stations of the third set, the mobile terminal MT3 detects and decodes the mini-intervals 531, 533 and 525 transmitted by the base station of the fourth set and the mobile terminal MT4 detects and decodes the mini-intervals 535, 537 and 525 transmitted by the base station of the fifth set.

Advantageously, the mini-intervals allocated to a given mobile terminal by a given set of base stations are transmitted on a physical channel other than the physical channels used for the transmission of mini-intervals allocated to the other mobile terminals and transmitted by the other sets of base stations.

According to a variant, the set of mini-intervals of the second header part are transmitted on a same second physical channel. Each mobile terminal receives and decodes then the entire second header part. The detection of data relating to a given mobile terminal is then for example made possible in that a mini-interval allocated to a given mobile terminal contains the identifier of this mobile terminal.

FIG. 9 shows a method for reception implemented in a mobile terminal 3, according to a particularly advantageous non-restrictive embodiment of the invention.

During an initialisation step 90, the different parameters of the mobile terminal are updated. In particular, the parameters corresponding to the signals to be transmitted or received and those of the corresponding sub-carriers are initialised in any manner (for example, following the reception of initialisation messages transmitted by one of the base stations, known as master station or by a server not represented of system 1, or by operator commands).

Then during a step 91, the mobile terminals MT1 to MT4 synchronously receive and decode a first pilot transmitted by the first set comprising the base stations BS1 to BS4 Based of this first pilot, one or more mobile terminals carry out a first estimation of the physical channel according to any method known to those skilled in the art. The estimation of the physical channel enables the mobile terminal to carry out an efficient demodulation of the signal received. In fact the mobile terminal receives a signal with interference caused by the propagation conditions: each of the signal sub-carriers is assigned a complex h coefficient (amplitude-phase) that modifies the transmitted signal: r=h·s, r being the signal received and s the signal transmitted (or constellation point transmitted). Without knowledge of this h coefficient, the mobile terminal can not determine the constellation point s used in the transmission. The transmission of the pilot, said pilot is known to the mobile terminal, enables the mobile terminal to determine the coefficient h (pilot_r=h·pilot_s, from which h_estimated=r/pilot_s). Hence, the mobile terminal can "rectify" the signal received (by carrying out r_corrected=r/h_estimated=(h/h_estimated)·s ~=s) and carry out an efficient demodulation.

Then, during a step 92, the first part of the header of the frame is decoded as described above in step 81 of FIG. 8.

During a step 93, each mobile terminal receiving the second part of the frame header receives and decodes one or more second pilots, the second pilot or second pilots being respectively transmitted by the base stations in communication with the mobile terminals under consideration. From each second pilot received, a mobile terminal then carries out one or more second physical channel estimations to adapt continually to the reception of mini-intervals or information elements representative of the allocation of intervals to the mobile terminals.

Finally, during a step 94, all or part of the second part of the header is received and decoded as described above at step 82 of FIG. 8. In the case where a second pilot is associated with each mini-interval or information element, step 93 of the second estimation of the physical channel is reiterated at each reception of a second pilot, followed by the reception and decoding of the mini-interval following or comprising the second pilot.

Naturally, the invention is not limited to the embodiments previously described.

In particular, the invention is not limited to a system comprising four base stations but also extends to a system comprising more than two sets and more than two base stations. The invention is also not restricted to a system comprising four mobile terminals but also extends to a system comprising more than two mobile terminals. The assignment of base stations of a same sub-set is not restricted to one mobile terminal but also extends to a plurality of mobile terminals.

Advantageously, the base stations of the system transmit the frames in a synchronised manner at a same frequency (that is to say with a negligible frequency deviation with respect to the OFDM system considered, typically less than 1 Hz for a system of DVB-T type). Advantageously the information elements or mini-intervals comprised in the second header part and allocated to a given mobile terminal are transmitted on a same second physical channel that differs from the other physical channels used for the transmission of other information elements allocated to other mobile terminals by the use of different sub-carriers in the case of an OFDMA type multiplexing and/or by application of a different spectrum spread code in the case of a CDMA type code.

Advantageously, the information representative of the structure of the frame contained in the first header part being broadcast by the set of base stations to the mobile terminals of system 1, the number of intervals comprised in the frame and the duration of each of these intervals is constant for the set of the network constituted of base stations BS1 to BS4 and the mobile terminals MT1 to MT4. According to a variant, the structure of the communication frame of the network is constant in time: the description of mini-intervals of the second header part and intervals of the payload of the frame is constant in time for all the frames. According to another variant, the structure of the frames vary in time. A field is then advantageously added in the frame header, this field comprising for example an item of information representative of the number of frames for which the structure of the frame described is valid. According to another variant, the description of the next frame for which the structure of the frame will be modified and transmitted in advance in the frame header of the frame transmitted just before the frame for which the structure is modified.

According to a variant, the first part of the frame header is divided into several parts. Each part of the first part of the frame header comprises a part of the information representative of the structure of the frame, for example a first part comprises a description of intervals for the downlink and a second part comprises a description for the uplink.

The invention claimed is:

1. A method for transmitting in a wireless network, the network comprising a plurality of base stations and at least one mobile terminal, the plurality of base stations of the network transmitting frames at a same frequency, wherein the method comprises the steps of:
   transmitting, by a first set comprising at least two base stations, of at least a first part of a frame header over a same first physical channel comprising at least a first temporal interval, and
   transmitting, by at least a second set comprising at least one base station, of at least a second part of the frame header on at least a second physical channel comprising at least a second temporal interval, said at least one second temporal interval being different from said at least one first temporal interval such that said at least one first temporal interval and said at least one second temporal interval do not temporally overlap each other, the at least one second set being different from the first set, the at least one second set being included in the first set.

2. The method according to claim 1, wherein the at least one second part of the frame header comprises at least one first information element representative of the allocation of at least one frame interval to at least one first mobile terminal.

3. The method according to claim 2, wherein the at least one first part of the header comprises an item of information representative of a frame structure, said at least one first information element making reference to at least one part of said information representative of the structure.

4. The method according to claim 1, wherein the at least one second part of the frame header comprises an item of information representative of a frame structure.

5. The method according to claim 1, wherein the at least one first part of the frame header comprises an item of information representative of the at least one second part of the header.

6. The method according to claim 1, wherein the transmitting of the at least one first part of the header comprises transmitting of at least a first pilot and in that the transmitting of the at least one second part of the header comprises transmitting of at least a second pilot.

7. The method according to claims 2, further comprising transmitting a second pilot for each at least one first information element.

8. The method according to claim 2, further comprising assigning of the at least one second set to at least one mobile terminal.

9. The method according to claim 2, further comprising:
   transmitting, by at least a third set comprising at least two base stations, of the at least one second part of the header, the at least one second part of the header comprising at least a second information element representative of the allocation of at least one frame interval to at least a second mobile terminal, said second and third sets having at least one common base station, said second and third sets being different, said at least one third set being different from the first set and being included in the first set.

10. A method for receiving in a wireless network, the network comprising a plurality of base stations and at least one mobile terminal, the plurality of base stations transmitting frames at a same frequency, wherein the method comprising the steps, implemented by the at least one mobile terminal, of:
   decoding of at least one received first part of the frame header, said at least one first header part being transmitted by a first set comprising at least two base stations on a same first physical channel comprising at least a first temporal interval, and
   decoding of at least one part of at least one received second part of the frame header, the at least one second part of the header being transmitted by at least one second set comprising at least one base station on at least one second physical channel comprising at least one second temporal interval, said at least one second temporal interval being different from said at least one first temporal interval such that said at least one first temporal interval and said at least one second temporal interval do not temporally overlap each other, the at least one second set being different from the first set, the at least one second set being included in the first set.

11. The method according to claim 10, wherein the at least one second part of the header comprises at least one information element representative of the allocation of at least one frame interval to said at least one mobile terminal.

12. The method according to claim 10, wherein the method comprises at least one first physical channel estimation based on at least one first pilot associated with the at least one first part of the header and at least one second physical channel estimation based on at least one second pilot associated with the at least one second header part.

13. A mobile terminal in a wireless network, the network comprising a plurality of base stations, the plurality of base stations transmitting frames at a same frequency, wherein the mobile terminal comprises:

a decoder configured for decoding at least one received first part of the frame header, said at least one first header part being transmitted by a first set comprising at least two base stations on a same first physical channel comprising at least a first temporal interval, and a decoder configured for decoding at least one part of at least one received second part of the frame header, the at least one second part of the header being transmitted by at least one second set comprising at least one base station on at least one second physical channel comprising at least one second temporal interval, said at least one second temporal interval being different from said at least one first temporal interval such that said at least one first temporal interval and said at least one second temporal interval do not temporally overlap each other, the at least one second set being different from the first set, the at least one second set being included in the first set.

14. The mobile terminal according to claim 13, wherein the at least one second part of the header comprises at least one information element representative of the allocation of at least one frame interval to the mobile terminal.

15. The mobile terminal according to claim 13, wherein the mobile terminal comprises an estimator configured for estimating the at least one first physical channel based on at least one first pilot associated with the at least one first part of the header and for estimating the at least one second physical channel based on at least one second pilot associated with the at least one second header part.

* * * * *